United States Patent [19]
Stohlquist

[11] 3,770,096
[45] Nov. 6, 1973

[54] ARTICLE TRANSFER APPARATUS
[75] Inventor: Roger H. Stohlquist, Rockford, Ill.
[73] Assignee: Anderson Bros. Mfg. Co., Rockford, Ill.
[22] Filed: Mar. 20, 1972
[21] Appl. No.: 236,087

[52] U.S. Cl.................... 198/21, 198/173, 198/183
[51] Int. Cl............................................ B65g 47/00
[58] Field of Search...................... 198/21, 183, 173

[56] References Cited
UNITED STATES PATENTS
2,374,659   5/1945   Bassler.................................. 198/21
2,959,273   11/1960  Sykes................................... 198/183

Primary Examiner—Evon C. Blunk
Assistant Examiner—Douglas D. Watts
Attorney—Vernon J. Pillote

[57] ABSTRACT
An article transfer apparatus including laterally spaced endless chains having horizontal rollers extending therebetween to provide a travelling roller bed for supporting articles on its upper run. The upper run of the roller bed is adapted to advance beneath an article without concomitant advance of the article, and one or more article pusher members are mounted on the chains intermediate adjacent ones of the rollers for vertical swinging movement relative to the chains and roller bed into and out of an operative article engaging position. Upper and lower tracks are provided along the upper run of the roller bed and a selectively operable mechanism is provided for guiding the article pusher members onto either the upper track to guidably support the article pusher members in an operative article engaging position, or onto the lower track to guide the article pusher members in a lower or inoperative position during advance along the upper run of the roller bed. The article transfer mechanism is adapted for use with a crosswise extending article supply conveyor to automatically advance articles from the supply conveyor in spaced succession and in timed relation with a subsequent article processing machine.

8 Claims, 9 Drawing Figures

ARTICLE TRANSFER APPARATUS

BACKGROUND OF THE INVENTION

There are installations where it is desirable to receive articles supplied at random or in a continuous row, and to advance such articles at spaced intervals and in timed relation with some instrumentality such as an article processing machine. For example, in an article processing machine such as the wrapping machine shown in the U.S. Pat. No. 3,453,801 to R. H. Stohlquist, it is necessary to advance articles comprising either single items or groups of items at uniformly spaced intervals and in timed relation with the article processing machine. In that patent, an infeed conveyor having spaced flight bars is provided to advance articles at spaced intervals into the machine. However, it is still necessary to time the feeding of articles onto the infeed conveyor with the movement of the conveyor flights and a reciprocating transfer mechanism, operated in timed relation with the movement of the flights on the endless infeed conveyor, was heretofore provided for this purpose. Reciprocating type transfer mechanisms, however, are somewhat slow and, moreover, increase the overall size of the apparatus required for feeding articles to the article processing machine.

SUMMARY OF THE INVENTION

The present invention relates to an article transfer apparatus of the travelling roller bed type. The upper run of the roller bed is adapted to advance beneath an article positioned thereon without concomitant advance of the article, and one or more article pusher members are mounted on the roller bed for vertical movement between an operative article engaging position above the roller bed and an inoperative position below the roller bed. Selectively operable guide mechanism extending along the upper run of the roller bed is provided for selectively guiding each article pusher member in either its operative article engaging position to advance articles along the upper run of the roller bed, or in its inoperative lower position below the level of the roller bed. The pusher guide mechanism is adapted for operation in response to articles advanced onto the roller bed to automatically advance articles supplied at random or in a continuous row from a crosswise supply conveyor in timed relation with a subsequent article processing machine.

An important object of this invention is to provide an article transfer apparatus of the travelling roller bed type which is selectively operable to either advance or interrupt advance of articles along the roller bed while the roller bed is in motion and without necessitating starting and stopping of the roller bed.

Another object of this invention is to provide an article transfer apparatus of the travelling roller bed type which is operable to advance articles at spaced intervals and in timed relation with a subsequent article processing machine.

Still another object of this invention is to provide an endless type article transfer apparatus operable to receive articles supplied at random or in a continuous row from a crosswise supply conveyor and to automatically advance the articles in spaced succession and in timed relation with a subsequent article processing machine.

These, together with other objects and features of the present invention will be more readily understood by reference to the following detailed description when taken in connection with the accompanying drawings wherein:

Figure 1:
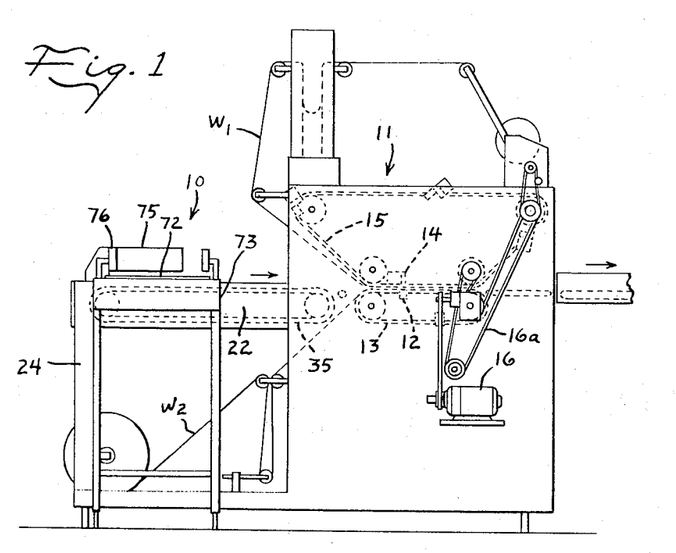
FIG. 1 is a side elevational view of the article transfer apparatus of the present invention shown applied to an article processing machine.
Figures 3, 9:
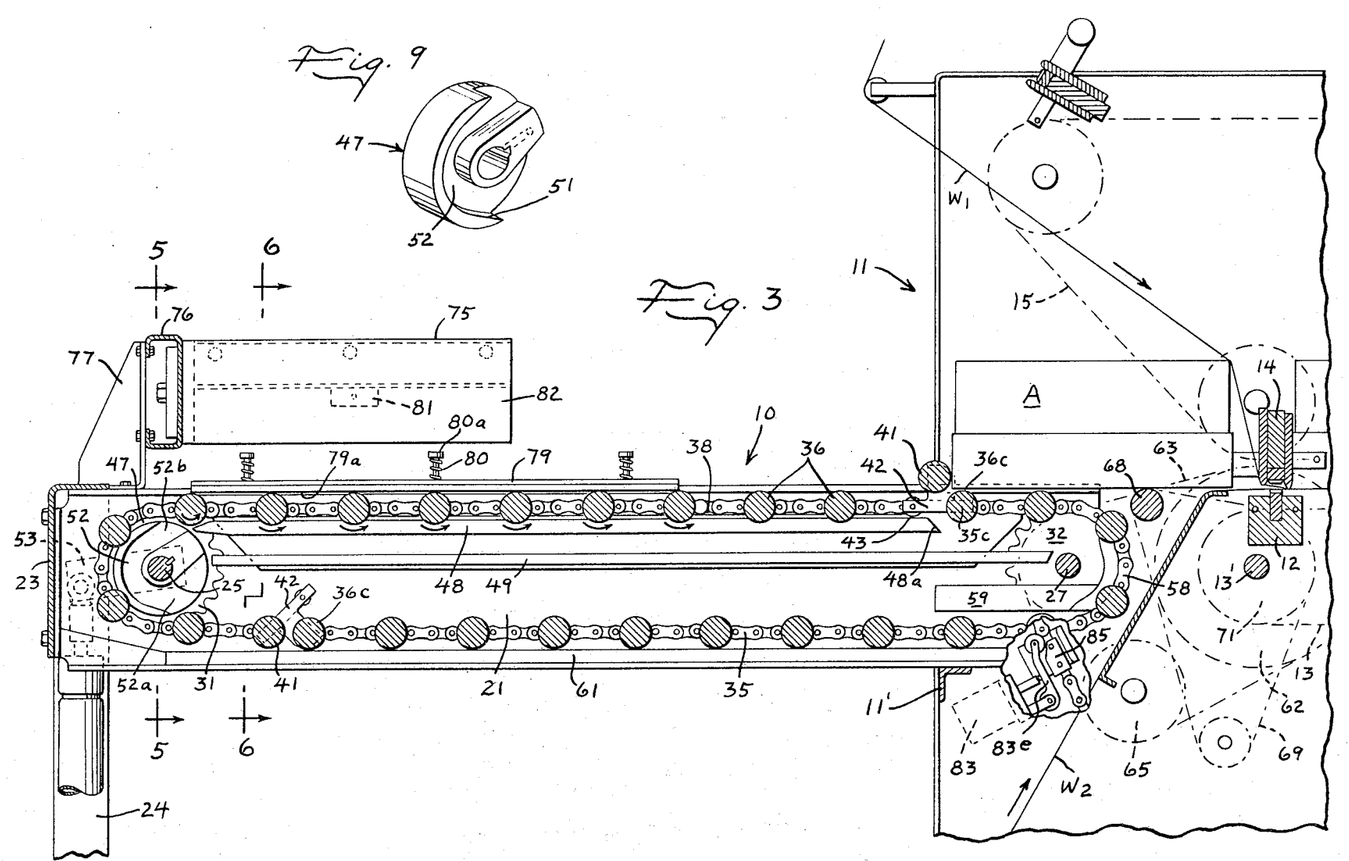
FIG. 3 is a longitudinal vertical sectional view through the article transfer apparatus.
FIG. 9 is a fragmentary perspective view of a guide cam forming a part of the article transfer apparatus.
Figure 4:
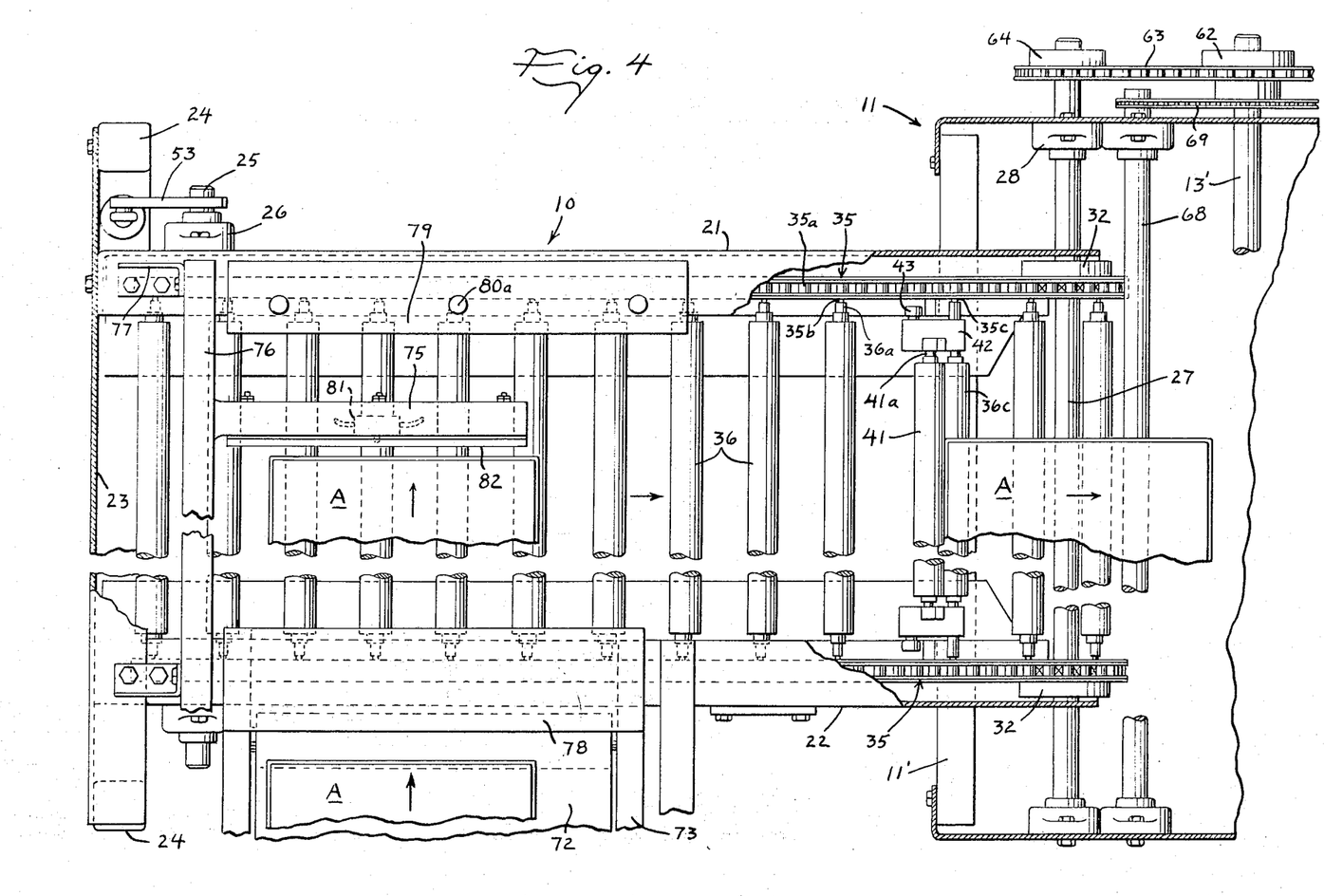
FIG. 4 is a fragmentary plan view of the article transfer apparatus with parts broken away and shown in section to illustrate details of construction.

The article transfer apparatus 10 of the present invention is adapted for advancing articles comprising a single item or groups of items, herein generally referred to as articles, and is shown in FIG. 1 applied to an article processing machine 11 for advancing articles A to the machine in timed relation therewith. The article processing machine can be of various different constructions and is herein shown as an article wrapping machine of the type disclosed in the U. S. Pat. to Roger H. Stohlquist No. 3,453,801 issued July 8, 1969. In general, the article wrapping machine disclosed in that patent is arranged to wrap articles between upper and lower webs of heat shrinkable plastic sheet material $W_1$ and $W_2$ and includes a plurality of lower sealing jaws 12 mounted at spaced locations along laterally spaced lower endless chains 13, and a plurality of upper sealing jaws 14 mounted at spaced locations on laterally spaced upper endless chains 15, the upper and lower chains being driven in timed relation to each other to draw the webs $W_1$ and $W_2$ of wrapping material around the article and to seal and sever the webs at the trail side of the article. The upper and lower chains 13 and 15 are driven in timed relation to each other as by a drive motor 16 through a drive train 16a (FIG. 1) and the article transfer apparatus 10 is arranged to advance articles to the machine 11 in timed relation therewith. As best shown in FIGS. 3 and 4, a power takeoff is provided from one of the chain shafts designated 13' on the machine for driving the article transfer apparatus 10. The details of construction of the article wrapping apparatus form no part of the present invention and reference is made to the aforementioned U. S. Pat. No. 3,453,801 for a more complete description of the construction and operation of the wrapping apparatus.

The article transfer apparatus 10 includes a supporting frame having a pair of laterally spaced side frame members 21 and 22, conveniently in the form of opposed generally U-shaped channel members. As best shown in FIG. 3, the side members of the frame are supported at one end on a bracket 11' on the machine 11 and are interconnected at their other end by a cross frame member 23 supported by legs 24. A first cross shaft 25 is rotatably supported by bearings 26 on the frame members 21 and 22 adjacent one end, and a second cross shaft 27 extends crosswise of the frame members 21 and 22 adjacent their other end and is rotatably supported as by bearings 28 shown in FIG. 4 as being mounted on the machine 11. A pair of idler sprockets 31 are non-slidably and rotatably mounted on the shaft 25 adjacent opposite sides of the transfer apparatus, and a pair of drive sprockets 32 are nonrotatably attached to the shaft 27 for rotation therewith. The transfer mechanism is of the travelling roller bed type and includes a pair of laterally spaced endless chains 35 each entrained over respective ones of the sprockets 31 and 32, and a plurality of article support rollers 36 which extend between the laterally spaced chains 35 at spaced locations therealong, the spacing between the rollers 36 being selected so as to be sufficiently close to provide adequate support for the articles or groups of items positioned thereon. The chains 35 are preferably of the so-called roller chain type including a plurality of links pivotally interconnected by pins and having chain rollers 35a (FIG. 4) extending therebetween, and the chains are guided along their upper run by chain guide rails 38 attached to the inner sides of the frame members 21 and 22. The rails 38 support the chains during movement along the upper run and maintain the rollers 36 at a preselected level to support articles thereon. The rollers 36 are mounted for free axial rotation on the chains and have shaft ends 36a mounted as by laterally extending pins 35b on the chains 35. Rollers 36 include bearings (not shown) which support the same for free axial rotation about their shafts 36a so that the rollers move physically with the chains 35 but are free to turn about their axes. With this arrangement, the rollers do not propel or advance an article therewith but instead roll under an article as the upper run of the chains advances in the direction indicated by the arrow in FIGS. 3 and 4.

Figure 5:
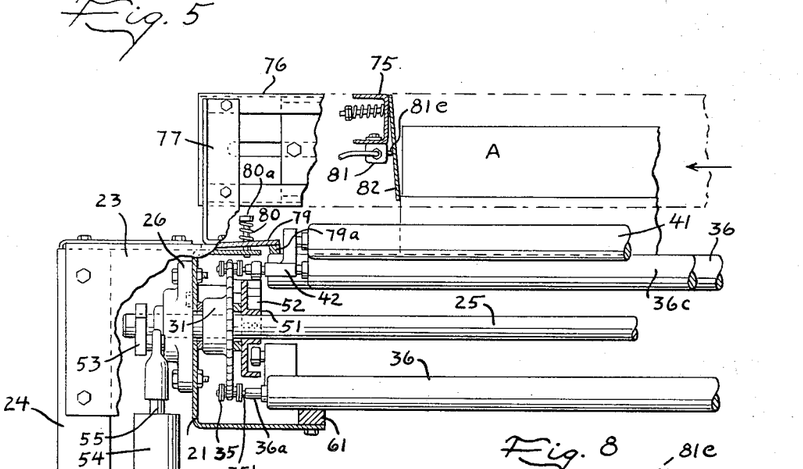
FIG. 5 is a fragmentary transverse vertical sectional view taken on the plane 5—5 of FIG. 3.
Figure 6:
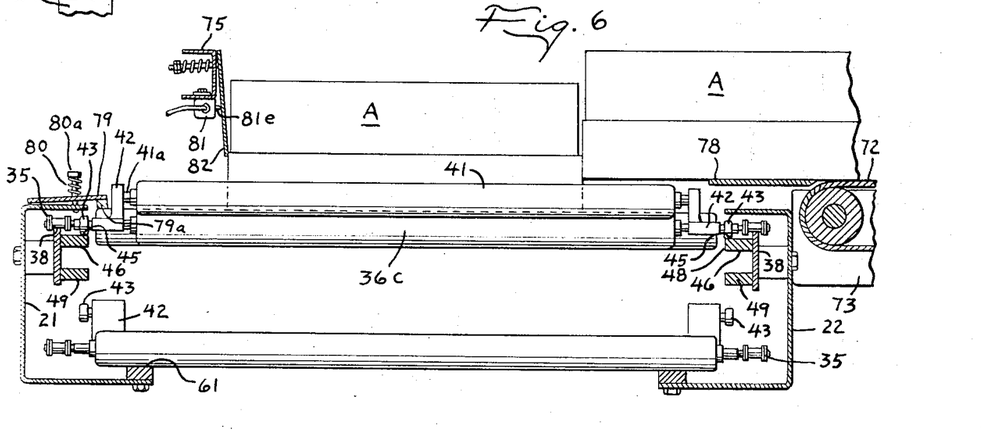
FIG. 6 is a fragmentary transverse vertical sectional view taken on the plane 6—6 of FIG. 3.
Figure 7:
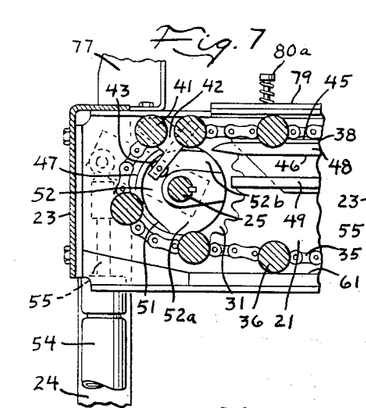
FIGS. 7 and 8 are fragmentary longitudinal sectional views illustrating the parts in different moved positions.
Figure 8:
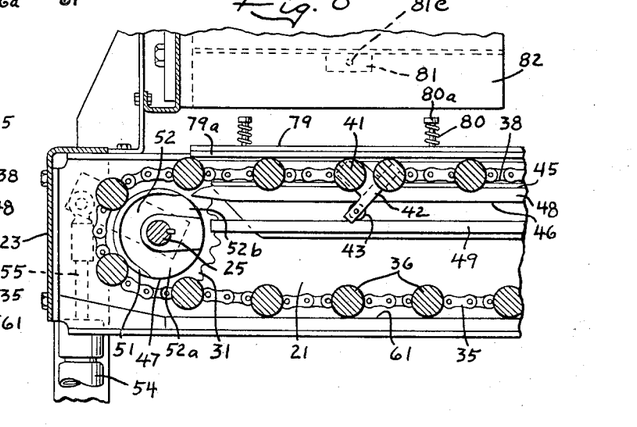

Advance of articles with the travelling roller bed is effected by one or more article pusher members 41 herein shown two in number and which are mounted at spaced locations along the chains for movement with the travelling roller bed and also for limited movement relative thereto between an operative position in which the article pusher members project above the roller bed during movement along the upper run, and an inoperative position in which the article pusher members are disposed at or below the level of the roller bed during movement along its upper run. As best shown in FIGS. 3 and 4, the article pusher members are supported by brackets 42 for vertical swinging movement about a crosswise pivot axis defined by pivot pins 35c secured to the chains 35. The pivot pins 35c support the brackets for vertical swinging movement relative to the chains and each article pusher member 41 is attached to its respective brackets at a point radially offset from the axis of the pivot pins 35c for movement relative to the chains between an operative raised position as shown in FIGS. 3, 5 and 6 and a lowered position as shown in FIGS. 7 and 8. A roller designated 36c similar to the rollers 36 but relatively shorter in length is conveniently rotatably mounted on the brackets 42 for rotation about an axis aligned with the axis of the pivot pins 35c to underlie and support an article adjacent the article pusher members 41. While the article pusher members 41 can be rigidly secured to the brackets, they are preferably in the form of rollers supported for axial rotation on shafts 41a and so arranged as to be disposed at the level of the rollers 36, 36c, when the article pusher members 41 are in their lowered position shown in FIGS. 7 and 8. Thus, when the article pusher members 41 are in their lowered position, they also underlie and will aid in supporting an article on the upper run of the roller bed.

Followers 43, conveniently in the form of wheels, are mounted on the brackets 42 at locations radially offset from the axis of the pivot pins 35c and follower guide tracks are provided at opposite sides of the transfer apparatus and mounted on the frame members 21 and 22 for guiding the followers and the article pusher members 41 either in a raised position or in a lowered position during movement along the upper run of the roller bed. The follower guide tracks include upper and lower trackways 45 and 46 extending longitudinally of the upper run of the roller bed and a gate mechanism 47 is selectively operable to guide the followers 43 onto either the upper track 45 or the lower track 46. As best shown in FIG. 6, the upper trackway 45 is formd by the upper surface of guide rails 48 attached to the side frame members 21 and 22 to extend along at least a substantial portion of the upper run of the roller bed, and the lower trackway 46 is formed at the underside of the guide rails 48. A second guide rail 49 is preferably provided below the rail 48 to guidably support the follower 43, when the article pusher member 41 is in its lowered position as shown in FIGS. 7 and 8.

The gate mechanism 47 includes a pair of rotary cam members 51 nonrotatably secured as by a key to the shaft 25 and having semicircular cam tracks 52 on their registering faces. As shown in FIGS. 3, 7 and 8, the inlet ends 52a of the cam tracks face forwardly below the shaft 25 and are relatively wide to re-ceive the follower wheels 43 as the article pusher members move along the return run of the roller bed. The cam tracks have a width to guidably receive the follower wheels 43 and the outlet ends 52b of the cam tracks face forwardly above the shaft 25 and are movable from a position as shown in FIG. 3 for guiding the follower wheels onto the upper trackway 45, to a position as shown in FIGS. 7 and 8 for guiding the follower wheels onto the lower trackway 46. An arm 53 is nonrotatably attached to the shaft 25 for turning the shaft and the cams 51, and an actuator, herein shown in the form of a linear fluid actuator having a cylinder 54 and rod 55, is provided for moving the arm 53 to rotate the shaft 25 and cams 51. The cylinder 54 is conveniently mounted on the legs 24 of the frame and the rod is swively connected to the arm 53 at a location radially offset from the shaft 25. Thus, the gate 47 can be selectively operated to either guide the followers 43 onto the upper trackway to raise the article pusher member 41 for advancing an article along the upper run of the roller bed, or to guide the follower wheels 43 onto the lower trackway to prevent advance of articles along the upper run of the roller bed. The upper trackway extends along at least a substantial portion of the upper run of the roller bed and may extend the full distance between the sprockets 31 and 32, if desired to advance the article the full length of the roller bed. However, the upper rails 48 can be made shorter so as to allow movement of the article pusher member to its lower or inoperative position before the article pusher member reaches the end of the roller bed. As shown in FIG. 3, the upper rail 48 terminates at 48a somewhat in advance of the sprocket 32 so that the article pusher member can move downwardly out of article engaging position to interrupt advance of the article before it reaches the end of the roller bed. Return guides 58 (FIG. 3) are advantageously mounted as by brackets 59 on the side frame members and arranged to engage the follower wheels 43 as the article pusher members move around the sprockets 32, to guide the follower wheels to a position above the level of the return run of the roller bed. Support rails 61 are also preferably provided on the side frame members 21 and 22 to underlie and support the article pusher members 41 during movement along the return run, to maintain the follower wheels 43 above the chains 35 during movement along the return run. This arrangement also facilitates guiding of the follower wheels 43 into the inlet ends 52a of the cam tracks 52.

As best shown in FIGS. 3 and 4, shaft 27 of the article transfer mechanism is driven in timed relation with the machine 11, as by a sprocket 62 on the machine shaft 13' which is connected through a chain 63 to a sprocket 64 on the inlet conveyor shaft 27. An idler sprocket 65 (FIG. 3) is provided for a purpose described hereinafter. The drive from the machine shaft 13' to the conveyor shaft 27 is timed so that the article pusher members 41 on the conveyor advance articles in timed relation with the machine 11. For example, the wrapping machine 11 completes one operating cycle in the time interval required to advance the lower sealing jaws 12 a distance equal to the spacing between these jaws, and the relative size of the sprockets 62, 64 is selected so that the chains 35 of the article transfer apparatus are advanced a distance equal to the spacing between adjacent ones of the article pusher members 41 in the time interval during which the sealing jaws 12 on the machine advance a distance equal to the spacing between adjacent sealing jaws. Moreover, the timing is preferably so arranged that the article pusher members 41 advance the articles until the lead side of the articles is closely adjacent the trail side of one of the sealing jaws 12. In the embodiment shown, the upper track 45 terminates before the end of the article transfer apparatus so that the article pusher members move downwardly to their inoperative positions before the article pusher members pass around the end sprockets 32. An article feed roll 68 is provided on the wrapping machine 11 between the end of the article transfer apparatus 10 and the path of movement of the sealing jaws 12, 14, which feed roll is driven as by a chain drive 69 from a drive sprocket 71 on the shaft 13' in a direction to aid advance of the articles from the transfer apparatus 10 into the machine 11.

The article transfer apparatus 10 is herein shown arranged for use with a crosswise article supply conveyor 72 and is arranged to receive articles supplied in random fashion or in a continuous accumulated row, and to automatically advance the articles at spaced intervals and in timed relation with the processing machine 11. As shown in FIGS. 1, 4 and 6, the supply conveyor 72 is conveniently of the endless belt type mounted on frame members 73 attached to one of the frame members 22. The supply conveyor 72 is driven by a motor (not shown) and is arranged to advance articles crosswise of the article transfer apparatus 10 into a position at the inlet end of the upper run of the endless roller bed and against a stop member 75. As shown, the stop member 75 is mounted on a cross member 76 attached to the frame members 21 and 22 by brackets 77, and the stop member is advantageously made adjustable along the cross member as best shown in FIG. 5 to enable adjustment of the lateral position at which the articles are stopped on the roller bed. An article guide 78, conveniently in the form of a dead plate, is provided between the end of the supply conveyor 72 and the article transfer apparatus 10 for guiding articles from the supply conveyor onto the upper run of the transfer apparatus. The rollers 36 of the travelling roller bed are free to rotate about their axes and do not normally advance the articles with the roller bed. In order to assure that the articles deposited on the roller bed are not prematurely advanced by the rollers, due to slight friction in the bearings for the rollers, a brake plate 79 having a friction stop 79a at its underside, is mounted on one of the side frames 21 and arranged to engage the upper surface of the rollers 36 as they advance past the inlet portion of the upper run of the roller bed. The brake plate is yieldably biased against the rollers 36 by springs 80 and the spring pressure is adjustable as by nuts 80a to apply just sufficient braking pressure to the rollers 36 to cause them to rotate in the direction indicated by the arrows thereon in FIG. 3 and prevent advance of the articles by the rollers alone. However, the article pusher members 41 are operative when in their raised position, to engage an article advanced onto the roller bed against the stop 75 and to advance that article along the transfer apparatus to the machine 11. It is necessary to prevent interference between the article pusher member 41 and the next succeeding article advanced by the supply conveyor 72. The guide plate 78 can be disposed as shown in FIG. 6 at a level sufficiently above the roller bed to allow the article pusher member 41 to pass below the article on the guide plate. As the articles are advanced by the supply conveyor 72 toward the stop 75, the articles drop off the guide plate 78 and onto the upper run of the roller bed and an article pusher member, when moved to its raised position, will thereafter advance the article on the roller bed to the machine 11. With this arrangement, the transfer mechanism can be adjusted for handling articles of widely different width. However, if the width of the articles is such that the line separating the article at the stop 75 from the next succeeding article on the supply conveyor is outwardly of the article engaging member 41 on the transfer mechanism, then the guide plate 78 can be disposed at a level below the top of the article engaging members 41 and closely adjacent the level of the roller bed so as to substantially eliminate any dropping of the article as it moves from the supply conveyor onto the transfer mechanism.

An article sensing mechanism 81 is provided for sensing advance of an article to a preselected position on the inlet section of the upper run of the transfer apparatus and the sensing mechanism is conveniently mounted on the stop 75 and actuated by a movable article engaging member 82, as best shown in FIG. 6. The sensing mechanism 81 is arranged, in a manner described more fully hereinafter, to control operation of the cam actuator 54 so as to shift the cam 51 to guide the article pusher member to its raised position when an article has advanced into position on the upper run of the transfer mechanism, and to shift the cam to guide the article pusher member in its lowered position in the absence of an article on the transfer apparatus. A timing mechanism 83 (FIGS. 2 and 3) is also provided and operatively connected to the sensing mechanism 81 so as to prevent operation of the actuator 54 and cam 51 from one position to the other at a time when the follower is about to leave the cam track 52. The timing mechanism 83 can be located at various different positions for operation in timed relation with the movement of the transfer mechanism and is herein shown operated from a cam 85 mounted on the drive chain 63 which drives the transfer mechanism in timed relation with the processing machine. The chain 63 has a length and is dirven at a speed correlative with the chain 35 and such that the cam 85 moves through one complete cycle in the time that the transfer mechanism chain 35 advances a distance corresponding to the spacing between adjacent article pusher members 41.

Figure 2:
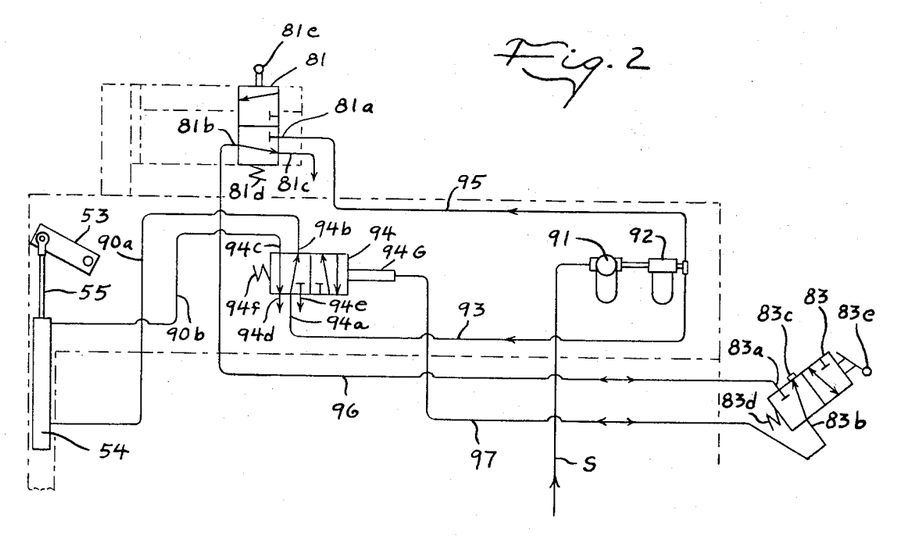
FIG. 2 is a schematic diagram illustrating the controls for the article transfer apparatus.

As diagrammatically shown in FIG. 2, the cam actuator 54 is of the pneumatic type and operating pneumatic pressure from a supply source S is supplied under the control of a pressure regulator 91 through filter 92 and line 93 to a flow reversing valve 94 which is arranged to reversibly supply operating pressure to opposite ends of the cylinder 54. Valve 94 has a pressure inlet 94a, controlled outlets 94b and 94c connected through lines 90a and 90b to the cylinder 54, and exhaust outlets 94d and 94e. The valve has a movable valve member normally urged as by a spring 94f to the position shown in FIG. 2 supplying operating pressure to the lower end of the cylinder 54 and exhausting fluid from the upper end of the cylinder. Valve 94 has an actuator 94g conveniently of the fluid pressure operated type which is operative, when said operating pressure is applied thereto, to move the valve to a position applying fluid pressure to the upper end of the cylinder 54 while exhausting fluid from the lower end of the cylinder. Sensing mechanism 81 and timing mechanism 83 are conveniently in the form of pneumatic valves, it being understood that electrical equivalents could be used for mechanisms 81, 83 and valve actuator 94g. Valve 81 has a pressure inlet 81a connected through line 95 with the pressure supply source S; a controlled outlet 81b and an exhaust outlet 81c. Valve 81 also has a movable valve member diagrammatically shown in FIG. 2 and which is normally urged, as by spring 81d to a first position shown in FIG. 2, blocking flow from the pressure inlet 81a and communicating the controlled outlet 81b to exhaust. Valve 81 is movable under the control of its actuator 81e to a second position communicating the pressure inlet 81a with the controlled outlet 81b to pass fluid under operating pressure to line 96. Valve 83 has a pressure inlet 83a connected to line 96 and a controlled outlet 83b connected through line 97 with the actuator 94g for valve 94. Valve 83 has an outlet 83c which is plugged or closed and a valve member which is normally biased by spring 83d to the position shown in FIG. 2 blocking flow from the pressure inlet 83a and communicating the controlled outlet 83b with the closed or blocked port 83c. The valve member of valve 83 is movable under the control of its actuator 83e to a second position communicating the pressure inlet 83a with the controlled outlet. Thus, valve 83 is arranged so as to time the application of the pressure signal from the article sensing valve 81 to the valve actuator 94g to prevent movement of the cam 51 from one position to the other at a time when a follower wheel is about to exit from the cam track 52. Valve 83 is also advantageously arranged to hold the cam 51 in the position it was set at the previous actuation of timing valve 83, to avoid unnecessary cycling of the cam from one position to the other. More specifically, cam 85 is arranged on the chain 63 so as to operate valve 83 from its first to its second position a short time interval before a follower 43 on one article pusher member 41 leaves the cam track 52 and, preferably, the cam 85 is arranged to operate valve 83 somewhat before the follower 43 enters the cam track, as shown in FIG. 3. The cam 85 effects a short duration movement of valve 83 from its first position to its second position to transmit the pressure condition in line 96 to line 97 and actuator 94g. If an article has advanced onto the roller bed and actuated valve 81 to its second position supplying pressure to line 96, then this pressure will be supplied to valve actuator 94g when cam 95 operates valve 83 to its second position. Conversely, if no article is present on the roller bed to actuate valve 81, then valve 81 will communicate line 96 to exhaust, and any fluid pressure in line 97 will be exhausted when valve 83 is moved to its second position. Cam 85, however, only effects a short duration movement of the valve 83 to its second position and then allows the valve 83 to return to its first position connecting the line 97 to the plugged of blocked port 83c. Valve 83, when it returns to its first position, will then maintain the pressure condition in line 97 which was transmitted to line 97 when valve 83 was previously moved to its first position. In this manner, valve 83, from one actuation to the next, will either maintain operating pressure on valve actuator 94g or maintain exhaust pressure on actuator 94g, dependent on the position of article sensing valve 81 at the time of the previous actuation of valve 83. Cam 51 will accordingly be shifted from one position to the other at the time valve 83 is actuated by cam 85, only if the position of valve 81 is different from that at the time valve 83 was previously actuated.

OPERATION

From the foregoing it is though that the construction and operation of the article transfer apparatus, will be readily understood. Articles comprising single items or groups of items, are advanced by the supply conveyor 72 crosswise of the roller bed to a position against the stop 75. The articles may be advanced in random fashion, that is intermittently or with variable spacing therebetween, or the articles might accumulate on the inlet conveyor in a continuous row. When an article is advanced by the cross conveyor onto the upper run of the roller bed, it is not advanced with the roller bed but the rollers 36 instead rotate about their axes beneath the article. The brake mechanism 79, 79a assists in rotating the rollers in a direction to oppose advance of the articles thereby. However, when the first article in a series strikes the stop 75, it moves valve 81 to its second position supplying operating pressure to line 96. Valve 83 normally prevents application of the pneumatic pressure in line 96 to line 97 and valve operator 94g until the cam 85 moves valve 83 to its second position. The pneumatic operating pressure from line 96 is then applied to actuator 94g to move valve 94 to a position supplying pressure to controlled outlet port 94c to operate actuator 54 and move the cam 51 to the position shown in FIG. 3. The follower 43 on the next article pusher member 41 will then be guided by cam track 52 onto the upper track 45 to raise the article pusher member above the roller bed and advance an article on the bed forwardly with the pusher member. If the articles are supplied by the supply conveyor in a substantially continuous row, then the end article in the row will be stripped off and advanced by the article pusher member. As soon as one article is moved away from the inlet section of the roller bed, valve 81 is released and a succeeding article can advance to a position on the bed against the stop 75. If the succeeding article again operates valve 81 to its second position before timing valve 83 is again operated, then the pressure in line 96 will again be the same as existed at the time valve 83 was previously operated by cam 85 and the cam 51 will remain in a position to guide the follower on the upper trackway 45. However, if the succeeding article from the supply conveyor is not advanced to a position to move valve 81 to its second position when the cam 85 again operates valve 83, valve 81 will be in its exhaust position when valve 83 is operated and pressure in line 97 will accordingly be exhausted. This allows valve 94 to move to the position shown in FIG. 2 in which it applies pressure to the lower end of actuator cylinder 54 to move the cam 51 to the position shown in FIGS. 7 and 8. The follower 43 on the next article engaging member 41 will then be guided onto the lower trackway 46 so that the article pusher member will be in its lower or inoperative position as it advances along the upper run of the roller bed. In this manner, the article pusher member will not interfere with a succeeding article which may advance from the supply conveyor onto the roller bed while the article pusher member moves along the inlet portion of the roller bed. Since the articles can rest on the roller bed after advance thereon and until engaged by the article pusher members 41, and since the article pusher members are advanced in timed relation with the processing machine, it will be seen that the article transfer mechanism will operate to advance articles to the machine 11 in timed relation therewith, even though the articles are supplied in random fashion or in a continuous row by the supply conveyor.

While a preferred embodiment of the invention has been herein illustrated and described, it will be apparent to those skilled in the art that changes and modifications may be made without departing from the invention in its broader aspects. It is therefore intended that the appended claims cover all such changes and modifications as fall within the true spirit and scope of the invention.

The embodiments of the invention in which an exclusive property or privilege is claimed are defined as follows:

1. In an article transfer mechanism including a frame and an endless travelling roller bed on said frame having an upper run adapted to underlie and support articles, the travelling roller bed including laterally spaced endless chains entrained over sprocket wheels rotatably mounted on the frame at locations spaced apart longitudinally of said upper run and a plurality of rollers extending between the chains at spaced locations therealong, and drive means for driving the endless chains to advance the upper run of the roller bed, the improvement comprising: at least one article pusher member extending crosswise of the endless roller bed and mounted on said laterally spaced endless chains intermediate adjacent ones of said rollers for vertical swinging movement relative to the chains and rollers about a pivot axis extending crosswise of said roller bed, follower means on said article pusher member laterally offset from said pivot axis, a first track means on said frame extending along at least a portion of the upper run of said endless roller bed adapted to engage said follower means as said article pusher member advances along the upper run of said endless roller bed for guidably supporting the article pusher member in a raised position projecting above the upper run of said roller bed to advance articles therealong, a second track means on said frame extending along at least a portion of said upper run of said endless roller bed adapted to engage said follower means as said article pusher member advances along said upper run of said roller bed to guide the article pusher member in a lower position no higher than the upper run of said roller bed, and follower guide means operable to guide said follower means selectively onto either said first track means or said second track means, said follower guide means including a cam mounted for turning about the axis of one of said sprockets and having a cam track movable therewith to guide the follower means selectively onto said first or said second track means, and means for selectively turning said cam.

2. In an article transfer mechanism including a frame and an endless travelling roller bed on said frame having an upper run adapted to underlie and support articles, the travelling roller bed including laterally spaced endless chains entrained over sprocket wheels rotatably mounted on the frame at locations spaced apart longitudinally of said upper run and a plurality of rollers extending between the chains at spaced locations therealong, and drive means for driving the endless chains to advance the upper run of the roller bed, the improvement comprising: at least one article pusher member extending crosswise of the endless roller bed and mounted on said laterally spaced endless chains intermediate adjacent ones of said rollers for vertical swinging movement relative to the chains and rollers about a pivot axis extending crosswise of said roller bed, follower means on said article pusher member laterally offset from said pivot axis, a first track means on said frame extending along at least a portion of the upper run of said endless roller bed adapted to engage said follower means as said article pusher member advances along the upper run of said endless roller bed for guidably supporting the article pusher member in a raised position projecting above the upper run of said roller bed to advance articles therealong, a second track means on said frame extending along at least a portion of said upper run of said endless roller bed adapted to engage said follower means as said article pusher member advances along said upper run of said roller bed to guide the article pusher member in a lower position no higher than the upper run of said roller bed, follower guide means operable to guide said follower means selectively onto either said first track means or said second track means, said article pusher member comprising an auxiliary roller supported for axial rotation about an axis laterally offset from said pivot axis, and said second track means includes means for guidably supporting said follower means to maintain said auxiliary roller at the level of the upper run of said travelling roller bed.

3. In an article transfer mechanism including a frame and an endless travelling roller bed on said frame having an upper run adapted to underlie and support articles, the travelling roller bed including laterally spaced endless chains entrained over sprocket wheels rotatably mounted on the frame at locations spaced apart longitudinally of said upper run and a plurality of rollers extending between the chains at spaced locations therealong, and drive means for driving the endless chains to advance the upper run of the roller bed, the improvement comprising: at least one article pusher member extending crosswise of the endless roller bed and mounted on said laterally spaced endless chains intermediate adjacent ones of said rollers for vertical swinging movement relative to the chains and rollers about a pivot axis extending crosswise of said roller bed, follower means on said article pusher member laterally offset from said pivot axis, a first track means on said frame extending along at least a portion of the upper run of said endless roller bed adapted to engage said follower means as said article pusher member advances along the upper run of said endless roller bed for guidably supporting the article pusher member in a raised position projecting above the upper run of said roller bed to advance articles therealong, a second track means on said frame extending along at least a portion of said upper run of said endless roller bed adapted to engage said follower means as said article pusher member advances along said upper run of said roller bed to guide the article pusher member in a lower position no higher than the upper run of said roller bed, follower guide means operable to guide said follower means selectively onto either said first track means or said second track means, an article conveyor means for advancing articles laterally of said endless travelling roller bed onto an inlet portion of said upper run of endless roller bed, an article stop means adjacent said inlet portion of said endless roller bed for stopping articles at a preselected lateral location thereon, brake means frictionally engaging the upper surface of said rollers as they move past said inlet portion of the upper run to normally inhibit advance of the articles with the travelling bed of rollers, means for sensing advance of an article onto said inlet portion of said upper run of said roller bed, and means controlled by said sensing means for operating said follower guide means to guide the follower onto said first track means.

4. In an article transfer mechanism including a frame and an endless travelling roller bed on said frame having an upper run adapted to underlie and support articles, the travelling roller bed including laterally spaced endless chains entrained over sprocket wheels rotatably mounted on the frame at locations spaced apart longitudinally of said upper run and a plurality of rollers extending between the chains at spaced locations therealong, and drive means for driving the endless chains to advance the upper run of the roller bed, the improvement comprising: at least one article pusher member extending crosswise of the endless roller bed and mounted on said laterally spaced endless chains intermediate adjacent ones of said rollers for vertical swinging movement relative to the chains and rollers about a pivot axis extending crosswise of said roller bed, follower means on said article pusher member laterally offset from said pivot axis, a first track means on said frame extending along at least a portion of the upper run of said endless roller bed adapted to engage said follower means as said article pusher member advances along the upper run of said endless roller bed for guidably supporting the article pusher member in a raised position projecting above the upper run of said roller bed to advance articles therealong, a second track means on said frame extending along at least a portion of said upper run of said endless roller bed adapted to engage said follower means as said article pusher member advances along said upper run of said roller bed to guide the article pusher member in a lower position no higher than the upper run of said roller bed, follower guide means operable to guide said follower means selectively onto either said first track means or said second track means, laterally spaced chain guide rails on said frame for guidably supporting said chains and the rollers carried thereby during movement along said upper run, said first and second track means including follower guide rails mounted on said frame laterally inwardly of said chain guide rails.

5. In an article transfer apparatus including a frame having laterally spaced side members, first and second shafts mounted on said side members to extend therebetween at spaced locations therealong, a pair of laterally spaced sprockets on each shaft and a pair of laterally spaced endless chains entrained over said sprockets to have an upper run thereof extend between respective sprockets on the first and second shafts, a plurality of rollers mounted on said pair of chains to extend therebetween at spaced locations therealong defining a travelling roller bed for supporting articles as the chains advance along said upper run thereof, and means for guidably supporting said rollers as they advance along said upper run of said chains, the improvement comprising a pair of brackets each pivotally connected to a respective one of said chains for vertical pivotal movement relative thereto about a pivot axis extending crosswise between said laterally spaced chains, an article pusher member connected to said brackets at a location radially offset from said pivot axis, a follower on each bracket radially offset from said pivot axis, a first track means on said side members engageable with said followers for guidably supporting said article pusher member at a level above said roller bed during movement along at least a portion of said upper run and a second track means on said side members below said first track means and engageable with said followers for guiding said article pusher member at a second level below said first level and no higher than said upper run of said roller bed during movement along said portion of said upper run, and follower guide means operable to guide said follower means selectively onto either said first track means or said second track means.

6. In an article transfer apparatus including a frame having laterally spaced side members, first and second shafts mounted on said side members to extend therebetween at spaced locations therealong, a pair of laterally spaced sprockets on each shaft and a pair of laterally spaced endless chains entrained over said sprockets to have an upper run thereof extend between respective sprockets on the first and second shafts, a plurality of rollers mounted on said pair of chains to extend therebetween at spaced locations therealong defining a travelling roller bed for supporting articles as the chains advance along said upper run thereof, and means for guidably supporting said rollers as they advance along said upper run of said chains, the improvement comprising a pair of brackets each pivotally connected to a respective one of said chains for vertical pivotal movement relative thereto about a pivot axis extending crosswise between said laterally spaced chains, an article pusher member connected to said brackets at a location radially offset from said pivot axis, a follower on each bracket radially offset from said pivot axis, a first track means on said side members engageable with said followers for guidably supporting said article pusher member at a level above said roller bed during movement along at least a portion of said upper run and a second track means on said side members below said first track means and engageable with said followers for guiding said article pusher member at a second level below said first level and no higher than said upper run of said roller bed during movement along said portion of said upper run, and follower guide means operable to guide said follower means selectively onto either said first track means or said second track means, said follower guide means including laterally spaced cams mounted for turning about the axis of said first shaft and each having a cam track movable therewith to guide said follower means selectively onto said first or said second track means and means for selectively turning said cams.

7. An article transfer apparatus according to claim 6 wherein said cams are nonrotatably secured to said first shaft inwardly of said sprockets on said first shaft and said sprockets are rotatably supported on said first shaft, said means for turning said cams including an actuator connected to said first shaft.

8. An article transfer mechanism according to claim 5 including means for advancing articles onto an inlet portion of the upper run of said roller bed, brake means frictionally engaging the upper surface of the rollers as they move past said inlet portion of the upper run for rotating said rollers in a direction to retard advance of the articles with the roller bed, means for sensing advance of articles onto said inlet portion of said upper run of said roller bed, and means controlled by said article sensing means for operating said follower guide means.

* * * * *